Aug. 4, 1970　　　　　　　C. W. OLOMAN　　　　　3,523,069
PROCESS FOR THE PRODUCTION OF DITHIONITES
Filed Jan. 29, 1969　　　　　　　　　　　　　2 Sheets-Sheet 1
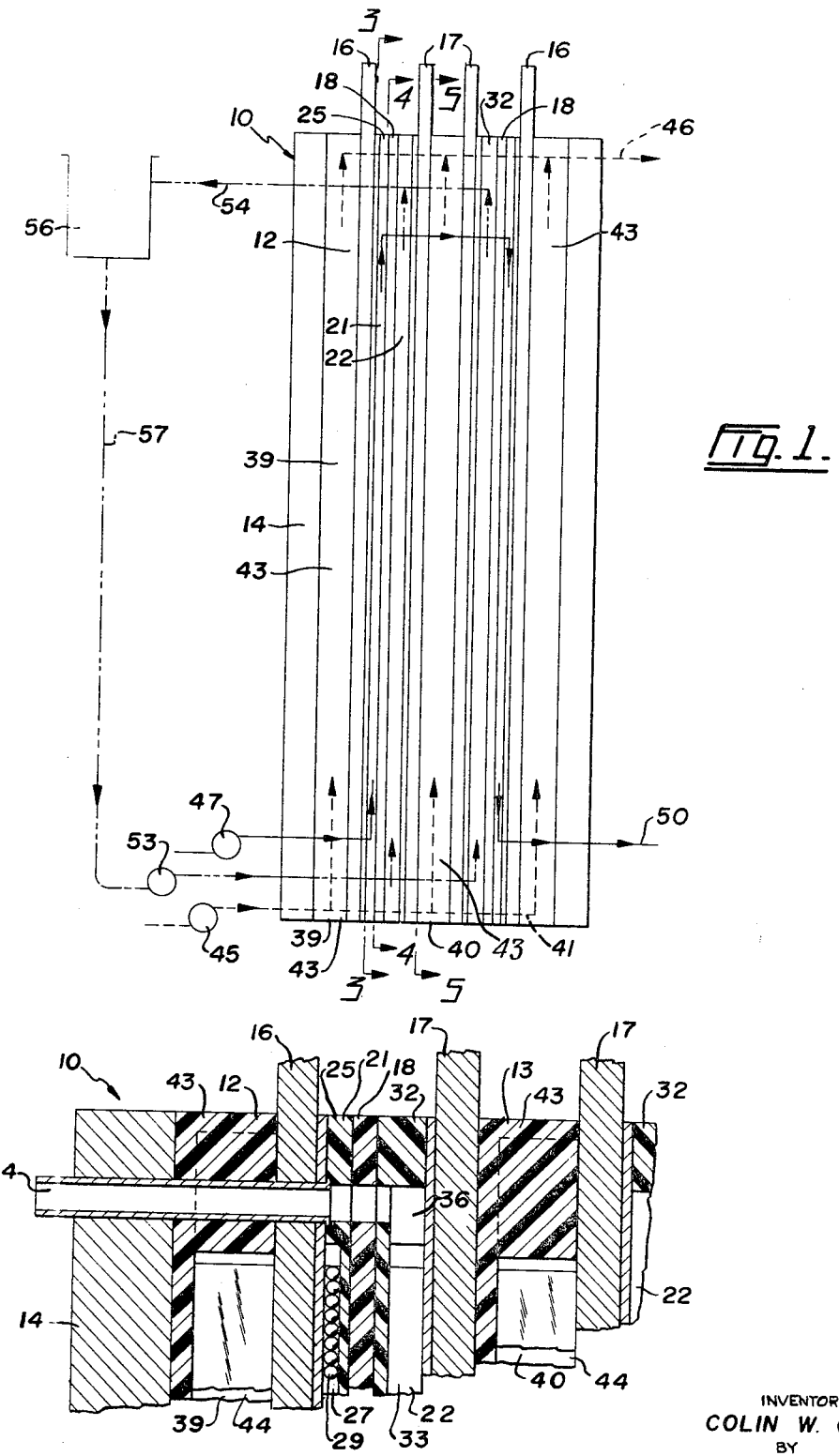
INVENTOR
COLIN W. OLOMAN
BY
Fetherstonhaugh & Co.
ATTORNEYS

United States Patent Office 3,523,069
Patented Aug. 4, 1970

3,523,069
PROCESS FOR THE PRODUCTION OF DITHIONITES
Colin W. Oloman, Vancouver, British Columbia, Canada, assignor to British Columbia Research Council, University of British Columbia, Vancouver, British Columbia, Canada
Filed Jan. 29, 1969, Ser. No. 795,110
Int. Cl. B01k 1/00; C01b 17/98
U.S. Cl. 204—92                12 Claims

ABSTRACT OF THE DISCLOSURE

There is described a process for the production of dithionites by electrolysis. A solution of sulphur dioxide in water is passed through an electrochemical reactor in which it is converted at a cathode in a cathode chamber to an acidic solution of dithionite. An appropriate anolyte is supplied to the anode. In the process, the catholyte temperature, cathode material, concentration of sulphur dioxide in the catholyte, pH of the catholyte, catholyte turbulence, current density on the cathode, surface area of the cathode, and the ratio of cathode surface area to cathode chamber volume are all carefully controlled.

BACKGROUND OF THE INVENTION

Field of the invention

This invention relates to a process for the production of dithionites, in particular, to an electrolytic process for the production of dithionites.

Prior art

Dithionites are commonly made by the chemical reduction of sulphur dioxide in water with metallic zinc. This is an old method, but is still considered to be the best.

It is known that sulphur dioxide in water can be reduced electrolytically to dithionite. The process of Worsley (British Pat. 218,347) makes use of this fact. However, in a solution of sulphur dioxide, which has a pH of approximately 1, the dithionite is very unstable. The rapid decomposition of the dithionite will generally cause losses of yield and current efficiency which make such a process uneconomic. Worsley has by-passed this problem by having the dithionite produced electrolytically in the presence of the materials to be treated with dithionite. This device is generally impractical, does not necessarily give economic use of the chemicals and the power consumed in the process, and does not produce dithionite as such.

To avoid the problem of rapid dithionite decomposition in solutions with a very low pH, most inventors have used the more weakly acid bisulphite solutions as the source of sulphur in the electrochemical process. The rate of decomposition of the dithionite in a solution of bisulphite (pH of 5) being much less than that in a solution of sulphur dioxide.

The bisulphite process has been developed to give strong solutions of dithionite (U.S. Pat. 2,193,323 of 1938, French Pat. 1,363,064 of 1964). However, increasing the pH of the catholyte solution raises the electrode potential necessary to form dithionite in that solution. This decreases the current density which can be effectively applied to a solution of given sulphur content. Also, the cost of sodium bisulphite is nearly twice that of the equivalent sulphur dioxide. These combine to give current efficiencies and/or chemical yields which make the bisulphite process uneconomical.

Thus the electrolytic method is not currently used as a means of producing dithionites.

SUMMARY OF THE INVENTION

It has previously been considered that the rate of decomposition of dithionite in very acid solutions is too great to allow the direct use of sulphur dioxide alone in water as a catholyte in the electrolytic process. However, I have studied the decomposition of dithionite in strong sulphur dioxide solution and determined that reasonable yields of dithionite are possible in this environment provided the conditions of the manufacture are carefully adjusted.

By making use of the low electrode potential for dithionite formation in strong acid solution and the low cost of sulphur dioxide I have developed an electrolytic process which produces dithionite at a cost competitive to that of the conventional zinc process. My process uses a simple solution of sulphur dioxide as the catholyte and uses carefully formulated process conditions to overcome the problem of dithionite instability and give a useful dithionite product with economic yield and power efficiency.

My process consists of passing a solution of sulphur dioxide in water through an electrochemical reactor in which it is continuously converted by cathodic reduction to an acidic solution of dithionite.

In the reactor the sulphur dioxide is reduced to dithionite in a cathode compartment which is separated by a cation permeable membrane from an anode compartment. The anode reaction may be any one which conveniently supports the cathode reaction. The anolyte can be one of the salts or hydroxides of sodium, potassium or ammonium, or one of the soluble salts of calcium or magnesium. For example the anode reaction can be the liberation of oxygen from sodium hydroxide or the liberation of chlorine from sodium chloride. Cations from the anode compartment migrate to the cathode compartment and became associated with the dithionite product. The acid product solution is neutralized as it leaves the cell to preserve the dithionite.

Due to the instability of the dithionite in the sulphur dioxide solution it is only by careful adjustment of the conditions in the cathode compartment that useful yields of dithionite are obtained. This is the essence of my invention.

The important process conditions are:

(a) the catholyte temperature
(b) the cathode material
(c) the concentration of sulphur dioxide in the catholyte
(d) the turbulence of the catholyte in contact with the cathode
(e) the current density on the cathode
(f) the total surface area of the cathode
(g) the ratio of cathode surface area to cathode chamber volume.

The ranges of these conditions over which it is possible to obtain dithionite are wide but the ranges for economic yields and current efficiencies are relatively narrow. For useful results the process conditions must be adjusted to obtain a favourable balance between their interacting effects.

The useful ranges of process conditions are:

(a) catholyte temperature—about 0 to about 40° centigrade
(b) cathode material—stainless steel, lead, mercury, aluminum, nickel, silver, copper, graphite, and the like
(c) concentration of sulphur dioxide in feed solution—about 2 to about 25 percent by weight pH of feed solution—about 0.5 to about 3.0
(d) turbulence of catholyte can be created as desired. For example, a flow of from about 1 to 40 metres per minute across the cathode surface produces desired turbulence.

(e) current density on cathode—about 50 to about 5000 amperes per square metre (f) ratio of cathode surface area to catholyte flow rate—about 0.2 to about 10 square metres per litre per minute (g) ratio of cathode area to cathode chamber volume—about 100 to 20,000 square metres per cubic metre.

Each of these conditions influences the process through interactions with the other conditions. However, considered independently, the effect of each condition can be described as follows:

(a) The catholyte temperature influences the process mainly through its effect upon the rate of dithionite decomposition. As the temperature is increased the dithionite becomes more unstable and both the yield and current efficiency in the process are reduced. Best results are obtained at the lowest temperature, but the cost of cooling increases as the temperature is brought down.

(b) The choice of cathode material depends on its corrosion resistance, its cost, its mechanical characteristics, and upon its hydrogen overvoltage. Several materials can be used, but each has its good and bad features. Stainless steel is suitable because it is common, chemically resistant, easily fabricated, and has electrochemical properties which allow it to give good current efficiencies for dithionite formation.

(c) The concentration of sulphur dioxide in the catholyte feed partly determines the current density which can be used on the cathode. Increasing the sulphur dioxide concentration enables an increase in the current density and therefore permits decreases in the size and cost of the electrochemical reactor required for a given dithionite production rate. However it becomes progressively more difficult to obtain high concentration of sulphur dioxide. Also, the rate of decomposition of the product dithionite obtained for a given yield increases out of proportion to the increase in current density which accompanies a rise in sulphur dioxide feed concentration. This lowers the maximum yield of dithionite obtained in the process as the sulphur dioxide feed concentration is increased.

The pH of the catholyte is fixed by the amount of sulphur dioxide that it contains. It is not necessary to modify the pH by adding a base to the catholyte feed. The dithionite becomes more stable as the solution pH rises, but its formation is more difficult and the whole process is changed.

(d) The turbulence of the catholyte as it contacts the cathode also helps to determine the current density which can be used on the cathode. A greater degree of turbulence allows a higher current density and thus improves the yield and current efficiency in the process. If the dithionite is formed on a flat cathode plate the turbulence is given by the velocity of the catholyte across the plate. Packing the cathode chamber improves the turbulence. An upper limit to the catholyte velocity is imposed by the mechanical difficulties of sustaining a high pressure drop across the catholyte circuit. In electrochemical reactors of different designs the turbulence can be obtained in different ways.

(e) As the current density applied to the cathode is increased the current efficiency of the process falls while the yield of dithionite rises. When the current density exceeds a critical value the dithionite yield begins to fall. The value of this critical current density depends upon the sulphur dioxide concentration and catholyte turbulence as described in (c) and (d) above. If the current density is too low the yield will be poor, but if it is too high, dithionite is destroyed in secondary electrode reactions.

(f) The ratio of cathode surface area to catholyte flow rate determines the degree of sulphur dioxide conversion which is possible at sub-critical current densities. If insufficient surface area is used the yield will be low. If too much area is used the catholyte residence time will be excessive and yield will be lost through chemical decomposition.

(g) An increase in the rate of cathode surface area to cathode chamber volume increases the rate of dithionite formation relative to its rate of decomposition. This improves both the yield and current efficiency in the process. High values of this ratio are desirable, but are mechanically difficult to obtain. A value of about 3000 square meters per cubic meter is the highest that can be expected in the filter press electrolyser described in the following example, but higher values can be obtained with such devices as a fluidized bed electrode.

The specific conditions under which the reactor should operate will depend upon the relative costs of sulphur dioxide, electric power, anolyte material, cooling water, neutralizing base and process equipment. In a reactor using sodium hydroxide as the anolyte with typical current costs the *preferred conditions* for the electrolysis are:

(a) catholyte temperature—15° C.
(b) cathode material—316 stainless steel
(c) concentrations of sulphur dioxide in catholyte feed—6 to 10 percent, pH of catholyte feed—0.8
(d) catholyte velocity—10 metres per minute
(e) current density on cathode 1200 to 400 amperes per square metre (decreasing as sulphur dioxide is converted)
(f) ratio of cathode area to catholyte flow rate—2 square metres per litre per minute
(g) ratio of cathode area to cathode chamber volume—1500 square metres per cubic metre.

Embodiments of the invention will be described in the following examples. The reactor referred to in these examples is illustrated in the drawings, in which:

FIG. 1 is a diagrammatic view of the reactor,

FIG. 2 is an enlarged fragmentary section through the upper end of the reactor,

Figure 3:
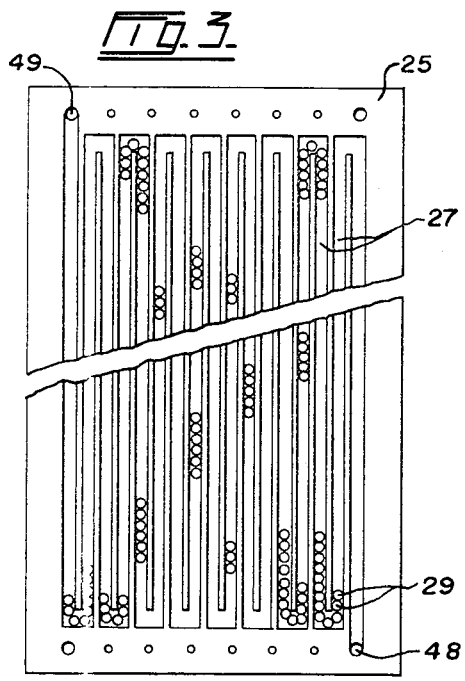
FIG. 3 illustrates a channelled gasket used in the cathode chamber.
Figure 4:
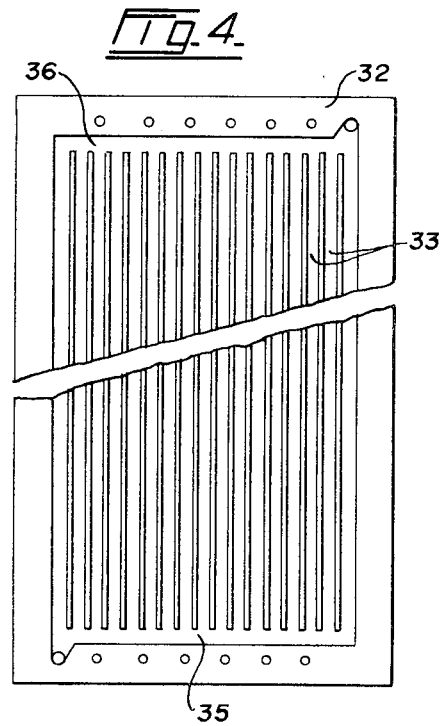
FIG. 4 illustrates a channelled gasket used in the anode chamber.
Figure 5:
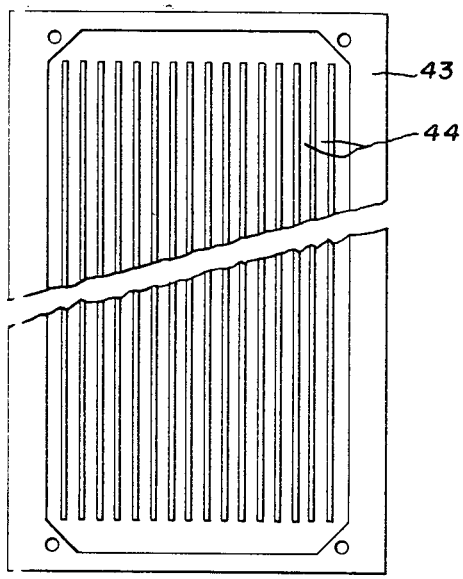
FIG. 5 illustrates a channelled gasket of the typical type used in cooling chambers of the reactor.

Referring to the drawings, 10 is an electrochemical reactor including two identical cells 12 and 13 placed back to back within a vessel 14.

Cell 12 comprises a cathode 16, an anode 17, and a cation membrane 18 separating cathode chamber 21 from anode chamber 22. A channelled gasket 25 fills chamber 21, and is formed with channels 27 therein which are connected in series. These channels are filled with inert balls 29. Another gasket 32 fills anode chamber 22 and is formed with parallel channels 33 connected at lower and upper ends with lower and upper header channels 35 and 36.

Cell 13 is the same as cell 12, and includes a cathode 16, an anode 17 and a cation membrane 18.

Cooling chambers 39, 40 and 41 are provided in vessel 14 respectively outside cathode 16 of cell 12, between anodes 17 of the two cells and outside cathode 16 of cell 13. A gasket 43 having parallel passages 44 therein fills each of these cooling chambers. Cooling water is directed by pump 45 into the gasket channels of cooling chambers 39, 40 and 41, near the bottom of said chambers, and water leaves vessel 14 at 46. The catholyte is directed by pump 47 into inlet 48 of gasket 25 of cell 12, whence it travels through series channels 27 to an outlet opening 49 of the gasket. This outlet communicates with the inlet 48 of gasket 25 of cell 13, and leaves the vessel at 50. The anolyte is directed by pump 53 into the lower header channels 35 of the two anode chamber gaskets 32, and leave vessel 12 at 54.

The reactor is provided with a recycling system whereby the anolyte can be recycled. This comprises a reservoir 56 which receives the anolyte from outlet 54, and a pipe 57 extending from reservoir 56 to pump 53.

With this arrangement of reactor 10, the catholyte flows over the surfaces of the two cathodes 16 in the series channels 27 of the two cathode gaskets 25. The anolyte travels over the surfaces of the two anodes 17 in the parallel channels 33 of the two anode gaskets 32. The cooling water is directed over the outer surfaces of the cathodes and anodes through the parallel passages of gaskets 43 in chambers 39, 40 and 41.

When the catholyte is flowed over the active surface of each cathode at sufficient velocity, turbulence is created over said surface. The inert balls 29 in each cathode chamber 21 also create turbulence in the catholyte within the cathode chamber. These balls also reduce the effective volume of the cathode chamber relative to the area of the active cathode surface. Each ball fills a certain volume of the chamber but has only a point contact with the cathode so that the effective surface area of the latter is reduced very little relative to the reduction in the volume of the cathode chamber.

In the illustrated reactor 10 which has been used in the process according to the present invention, each cathode measures 30 centimeters by 60 centimeters and is made of 316 stainless steel. The gaskets 25 and 32 are 0.15 centimeter thick, and the diameter of each ball 29 is 0.15 centimeter. These balls are made of a suitable inert material, and polyethylene balls have been found to be very suitable for this purpose. The gaskets mentioned are made of any suitable material, such as neopreme. The resulting free cathode area in each cell is 0.08 square meter, and the ratio of cathode surface to cathode chamber volume is about 1500 square meters per cubic metre.

EXAMPLE 1

A 7 percent solution of sulphur dioxide in water at 18 degrees centigrade is pumped continuously into the cathode chamber 21 at a rate of 0.075 litre per minute and a pressure of 30 pounds per square inch gauge. This catholyte traverses cell 12 and passes on to the cell 13, moving across the cathode surfaces at a velocity of about 12 metres per minute.

The current density on the cathode of cell 12 is held at 750 amperes per square metre and on the cathode of cell 13 is lowered to 450 amperes per square metre to accommodate the decreasing sulphur dioxide content of the catholyte.

The anolyte flows through the anode chambers in parallel channels, and the anodes are swept by a recycling 4 percent solution of sodium hydroxide at 2 litres per minute per cell.

Both anodes and cathodes are water cooled on the outside to maintain the catholyte temperature at 18 degrees centigrade.

To hold the stated current densities in this system requires a voltage drop across cell 12 of 5.6 volts and across cell 13 of 4.0 volts.

The catholyte emerges continuously from the reactor as a solution of sulphur dioxide and sodium dithionite, with some dithionite degeneration products, at a pH of about 1.7. The concentration of sodium dithionite in this product solution is 38 grams per litre. The corresponding current efficiency for dithionite production is 56 percent, the dithionite yield from sulphur dioxide is 40 percent, and the degree of sulphur dioxide conversion is 71 percent.

If the current density on the two cathodes is reduced to 500 and 370 amperes per square metre respectively, the current efficiency rises to 70 percent while the dithionite yield falls to 35 percent and the sulphur dioxide conversion to 50 percent. Higher current densities can cause losses in both current efficiency and chemical yield.

Operating under the first stated conditions the reactor will produce one pound of sodium dithionite with the consumption of 1.4 kilowatt hours of electric power, 1.9 pounds of sulphur dioxide and 0.8 pound of sodium hydroxide in the electrolysis. Such quantities allow dithionite manufacture at a commercially competitive price.

EXAMPLE 2

A 6.4 percent solution of sulphur dioxide in water is pumped at a rate of 0.05 litre per minute through cathode chambers 12 and 13 of the reactor as in Example 1.

The current density on the cathode of cell 12 is 380 amperes per square meter and on the cathode of cell 13 is 310 amperes per square metre. A 15 percent solution of sodium carbonate is recycled through the anode chambers at 2 litres per minute per cell. The voltage drops across cells 12 and 13 are 4.6 and 4.2 volts respectively. The temperature of the catholyte is maintained at 11° C. throughout the process.

Now the catholyte product contains 42 grams per litre of sodium dithionite. The yield of dithionite from sulphur dioxide is 48 percent, the current efficiency with respect to dithionite production is 72 percent and the sulphur dioxide conversion is 67 percent.

EXAMPLE 3

The polyethylene packing balls are removed from the cathode chambers of the reactor described above to give a ratio of cathode surface to cathode chamber volume of about 800 square metres per cubic metre. A catholyte solution containing 4.3 percent of sulphur dioxide in water is pumped through the reactor at 0.1 liter per minute, but current is delivered only to cell 13.

The current density on the cathode of cell 13 is 380 amperes per square metre. A 15 percent solution of sodium carbonate is used as anolyte at a rate of 2 liters per minute and the voltage drop across cell 13 is 3.5 volts. The temperature of the catholyte is kept at 18° C. throughout the process.

Here the catholyte product contains 12 grams per litre of sodium dithionite. The dithionite yield from sulphur dioxide is 21 percent, the current efficiency for dithionite production is 67 percent and the sulphur dioxide conversion is 31 percent.

I claim:

1. In the electrolytic production of a dithionite from sulphur dioxide in water the improvement that comprises carrying out the electrolysis in an electrochemical reactor having separate cathode and anode chambers under the following conditions:
  (a) catholyte temperature—about 0 to about 40° centigrade,
  (b) cathode material—suitable conductor not affected by the catholyte,
  (c) concentration of sulphur dioxide in feed solution about 2 to about 25 percent by weight,
  (d) maintaining the catholyte in turbulent condition at the cathode,
  (e) current density on cathode—about 50 to about 5000 amperes per square metre,
  (f) ratio of cathode surface area to catholyte flow rate—about 0.2 to about 10 square metres per litre per minute,
  (g) ratio of cathode area to cathode chamber volume—about 100 to about 20,000 square metres per cubic metre.

2. A process as claimed in claim 1 in which the pH of the solution in the cathode chamber is about 0.5 to about 3.0.

3. A process as claimed in claim 1 in which the cathode material is selected from the group consisting of stainless steel, lead, mercury, aluminum, nickel, silver, copper and graphite.

4. A process as claimed in claim 1 in which the cathode material is 316 stainless steel.

5. A process as claimed in claim 1 in which the anolyte used in the electrolytic reaction is selected from the group consisting of the salts and hydroxides of sodium, potasium and ammonium and the soluble salts of calcium and magnesium, and the product contains the corresponding cation dithionite.

6. A process as claimed in claim 1 in which the turbulence of the catholyte is created by flowing said catholyte over the cathode at a velocity of from about 1 to about 40 metres per minute.

7. A process as claimed in claim 1 in which the cathode chamber is filled with inert balls.

8. A process as claimed in claim 1 in which the anolyte used in the electrolytic reaction contains sodium hydroxide, the product of the electrolysis thus being sodium dithionite.

9. A process as claimed in claim 1 in which the reaction is carried out in a cell having cathode and anode chambers separated by a cation selective member.

10. In the process for the production of sodium dithionite by electrolysis of an aqueous solution of sulphur dioxide at the cathode and an anolyte selected from the group consisting of sodium hydroxide and sodium chloride, the improvement that comprises carrying out the reaction under the following conditions:

(a) catholyte temperature—10 to 20° C.
(b) cathode material—316 stainless steel
(c) concentration of sulphur dioxide in catholyte feed—6 to 10 percent
(d) catholyte velocity—5 to 15 metres per minute
(e) current density on cathode 1200 to 400 amperes per square metre (decreasing as sulphur dioride is converted
(f) ratio of cathode area to catholyte flow rate—1 to 4 square metres per litre per minute
(g) ratio of cathode area to cathode chamber volume—1000 to 2000 square metres per cubic metre.

11. A process as claimed in claim 1 in which the reaction is carried out in two cells each adapted so that catholyte can proceed through the cells in series, anolyte can proceed through the cells in parallel, and coolant can pass over the outer surfaces of the two cells.

12. A process as claimed in claim 9 in which the cathode chamber is filled with inert balls.

References Cited

FOREIGN PATENTS 218,347  7/1924  Great Britain.

DANIEL E. WYMAN, Primary Examiner

J. M. HICKEY, Assistant Examiner